(12) United States Patent
Abe

(10) Patent No.: US 6,282,174 B1
(45) Date of Patent: Aug. 28, 2001

(54) MOBILE COMMUNICATION SYSTEM

(75) Inventor: Masami Abe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/029,373

(22) PCT Filed: Jun. 26, 1997

(86) PCT No.: PCT/JP97/02208

§ 371 Date: Feb. 25, 1998

§ 102(e) Date: Feb. 25, 1998

(87) PCT Pub. No.: WO98/00984

PCT Pub. Date: Jan. 8, 1998

(30) Foreign Application Priority Data

Jul. 1, 1996 (JP) .................................................. 8-170875

(51) Int. Cl.$^7$ ..................................................... H04Q 7/02

(52) U.S. Cl. ........................... 370/252; 370/345; 370/468

(58) Field of Search ..................................... 370/252, 329, 370/336, 337, 345, 347, 468, 470, 472

(56) References Cited

U.S. PATENT DOCUMENTS

| | | | |
|---|---|---|---|
| 4,754,450 | * | 6/1988 | Lynk, Jr. et al. ...................... 370/29 |
| 5,761,223 | * | 6/1998 | Ando et al. ............................ 371/41 |

FOREIGN PATENT DOCUMENTS

| | | |
|---|---|---|
| 63-175537 | 7/1988 | (JP) . |
| 7 231292 | 8/1995 | (JP) . |
| 8-162977 | 6/1996 | (JP) . |
| 8 186543 | 7/1996 | (JP) . |

* cited by examiner

Primary Examiner—Melvin Marcelo
(74) Attorney, Agent, or Firm—Venable; Robert Kinberg; Catherine M. Voorhees

(57) ABSTRACT

This invention uses a plurality of encoding methods for communication between a base station BS and a mobile station MS. When the base station BS encodes a transmission signal, a suitable encoding method is selected from a plurality of encoding methods based on traffic conditions, the peripheral environment of the mobile station MS, etc. The base station BS notifies which encoding method has been used to the mobile station MS. The mobile station MS recognize the encoding method used by the base station BS from the information notified from the base station BS. The mobile station MS decodes a receive signal using a method corresponding to this encoding method.

12 Claims, 3 Drawing Sheets ized as TS#1-TS#3.
MOBILE COMMUNICATION SYSTEM

BACKGROUND ART

This invention relates to a mobile communication system, and particularly to a mobile communication system comprised of a base station and a mobile station connected to this base station by a radio link.

TECHNICAL FIELD

Mobile communication systems as well as cellular systems are rapidly becoming widespread. This had led to the number of mobile communication terminals (hereinafter referred to as a mobile station) also increasing dramatically. Together with the increase in the number of mobile stations, the amount of traffic has also increased. This results in the system approaching the limit of its ability to accommodate mobile stations. Because of this type of situation, there has been a demand for an increase in the mobile station accommodating capacity of a system.

As one example of a cellular system, the transmission format of the IS-136TDMA (Time Division Multiple Access) digital portable telephone system currently utilized in the USA is as shown in FIG. 1. As shown in FIG. 1 (A), one frame of a TDMA data stream has a length of 20 msec, and one frame is divided into three time slots TS#1–TS#3. Thus one time slot has a length of 6.67 msec. A base station carries out communication to a mobile station, and that mobile station is assigned to a free time slot. For example, mobile station A is assigned to time slot #1 and mobile station B is assigned to time slot #2. As a result, mobile station A receives a signal from the base station in the time zone of time slot #1. Mobile station A also transmits a signal to the base station in a separate time slot, for example the time zone of time slot #2. Specifically, as shown in FIG. 1, for transmission from the base station to the mobile stations, time slots #1, #2, and #3 are repeatedly and continuously transmitted. For individual mobile stations, communication from the base station is cyclic. Communication from the mobile stations to the base stations is carried out using burst transmission, as shown in FIG. 1 (B). Each time slot has the same bit rate as all of the other time slots.

The detailed organization of a time slot when the base station transmits to a mobile station will be described using FIG. 2. As shown in FIG. 2, a synchronization sequence is arranged at the head of each time slot. After this synchronization sequence, there is a control code followed by data. A separate control code is inserted into the data portion. The end of the time slot contains reserved bits. The number of bits of each essential element of the time slot is shown in FIG. 2. Namely, one time slot includes an overall total of 324 bits made up of 260 data bits and 64 bits of control code other than the data.

In current TDMA cellular systems, a specific carrier frequency is used as a control channel. One time slot from among the time slots of this control channel is used for sending and receiving various control information. This means that the number of time slots that can be used for subscriber communication is reduced. Accordingly, it has been considered to increase the number of time slots used in subscriber communication by increasing the number of time slots multiplexed at the carrier frequency of the control channel. This can be expected to increase the mobile station accommodating capacity of the system. Also in this case, it has been considered to increase the mobile station accommodating capacity of the overall system by automatically setting a mode for every individual mobile station.

DISCLOSURE OF THE INVENTION

The object of the current invention is to provide a mobile communication system that can increase the number of mobile stations multiplexed at a single carrier frequency.

Another object of the present invention is to provide a mobile communication system that can dynamically establish a communication mode of individual mobile stations.

Specifically, the present invention is a mobile communication system comprising at least one base station and at least one mobile station. The base station has an encoding circuit for encoding a transmission signal for a mobile station. This encoding circuit has a number of encoding methods for encoding the transmission signal for the mobile station. The base station selects an appropriate encoding method based on traffic conditions, the surrounding environment of the mobile station, etc. As a result, the base station encodes the transmission signal for the mobile station using the selected encoding method. The base station then adds a decoding method to the signal to be received by the mobile station, and transmits them to the mobile station. The mobile station decodes the signal received from the base station using the decoding method notified from the base station.

The base station dynamically selects an encoding method for every individual mobile station and for every single coded unit. That is, the base station can select a mode in which the number of bits in a code string is small while taking into consideration the communication quality demanded by a user at that time.

BRIEF DESCRIPTION OF THE DRAWINGS

FIG. 1 (A) shows the format of a downlink, and FIG. 1 (B) shows the format of an uplink.

BEST MODE FOR CARRYING OUT THE INVENTION

Figure 3:
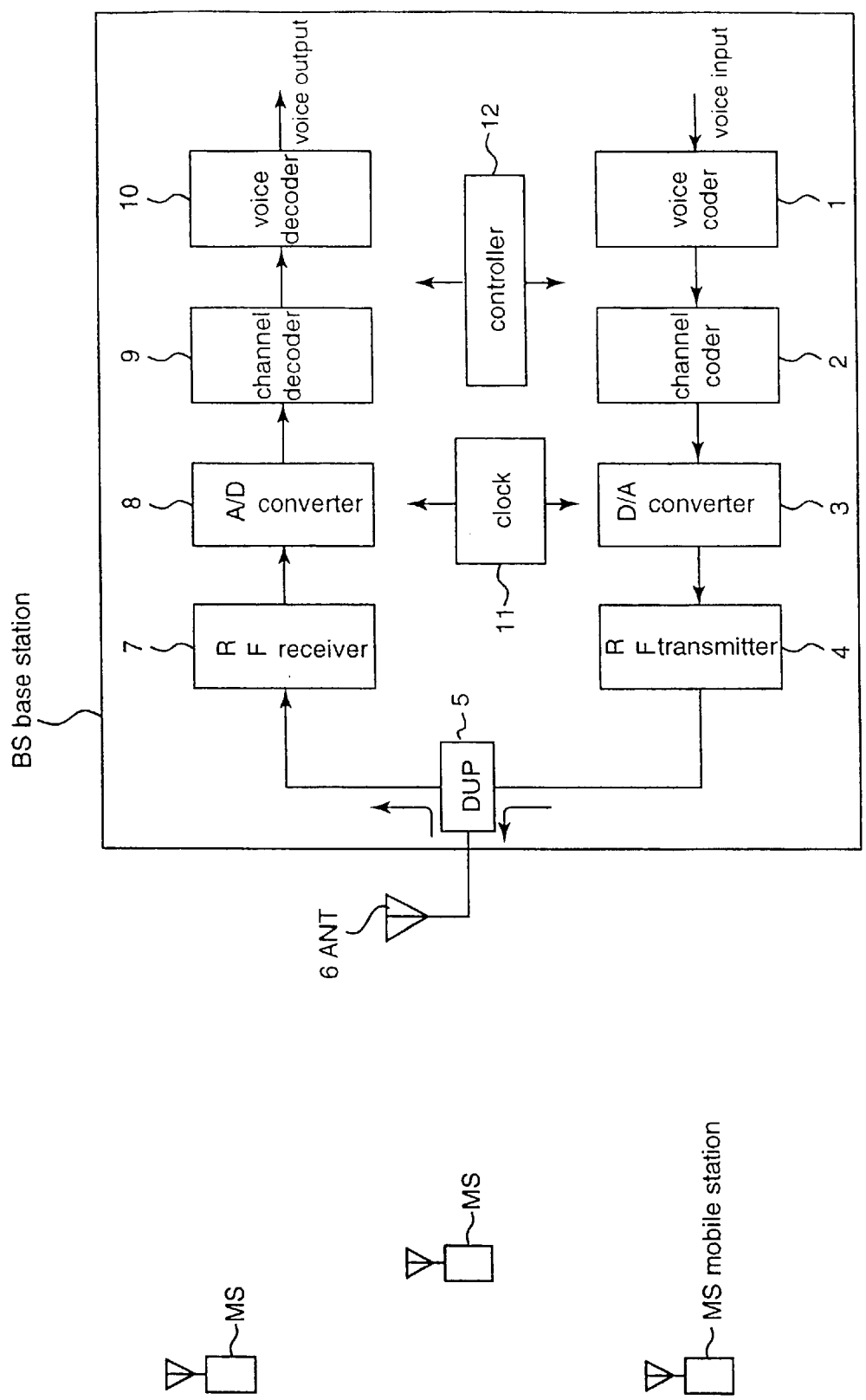
FIG. 3 is a drawing showing a mobile communication system of this invention.

An embodiment of this invention will be described below taking an example of a TDMA type cellular system. This invention is not, however, limited to a TDMA cellular system. The structure of a mobile communication system of this invention is shown in FIG. 3. The system is comprised of a base station BS, and mobile stations MS. The base station BS forms frames having consecutive time slots for a plurality of mobile stations, and these frames are repeatedly transmitted. At the same time, the base station BS receives signals transmitted in burst fashion from the plurality of mobile stations MS. Since this invention mainly concerns the transmission and reception system, the description will be centered on these parts.

First of all, description will be given for the transmission circuit of the base station BS transmission system. The transmission circuit has a voice coder 1, a channel coder 2, a D/A converter 3 and an RF transmission section 4. The voice coder 1 turns voice input into digital data. The channel coder 2 attaches error correction code to the voice signal that has been changed to digital data in the voice coder 1, and carries out interleave conversion. The resultant signal is formed into data having a format for transmission to a mobile station MS. The D/A converter 3 converts the data that has been converted to the transmission format into an analog baseband signal. The RF transmission section 4 converts the analog base band signal into modulated waves. The modulated waves are radiated into space from an antenna, via a duplexer 5.

On the other hand, the receive circuits is constructed as described below. Namely, the receive circuit has an RF receiver section 7, an A/D converter 8, a channel decoder 9, and a voice decoder 10. The RF receiver section 7 is supplied with a signal received by the antenna 6, via the duplexer 5, and this received signal is converted to an analog baseband signal. The A/D converter 8 samples the analog baseband signal to generate a receive digital stream. The channel decoder 9 analyzes the receive data and divides it into user data and control information. After carrying out this analysis, the channel decoder 9 executes deinterleaving, error correction decoding and error detection processing. The voice decoder 10 restores a digital voice signal supplied from the channel decoder 9 to a voice signal.

Figure 1:
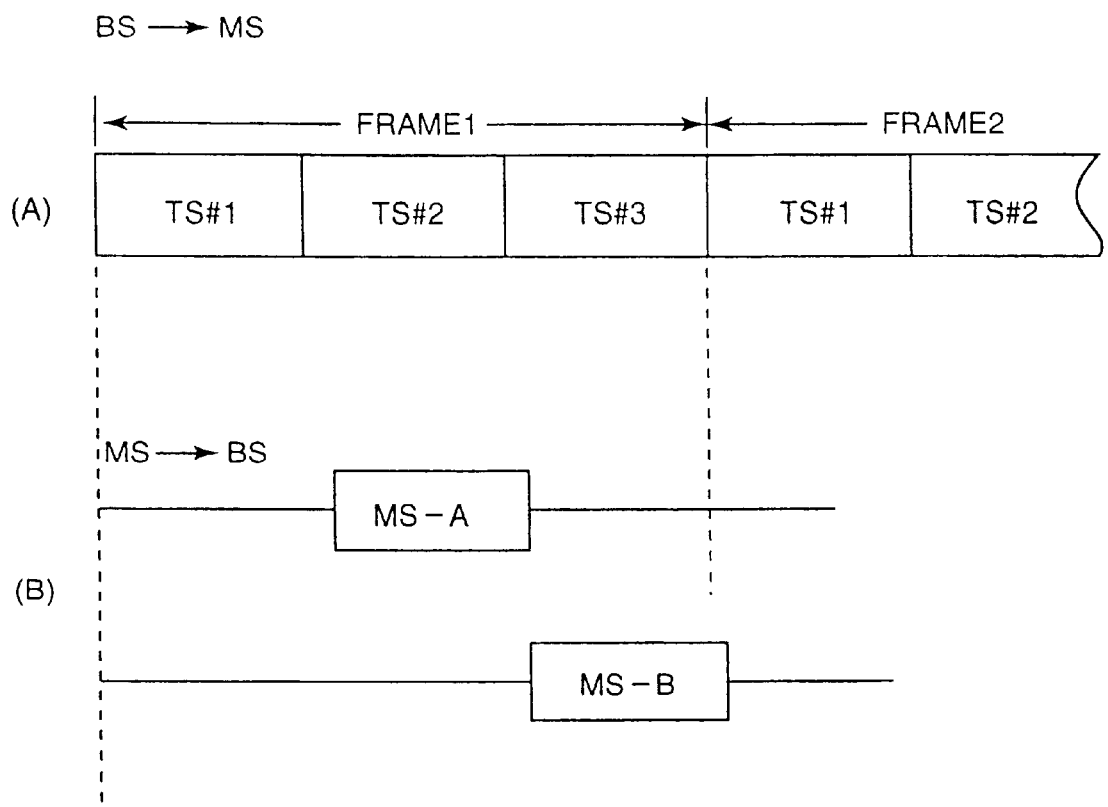
FIG. 1 is a drawing showing a transmission format of a digital portable telephone of the TDMA system.
Figure 2:
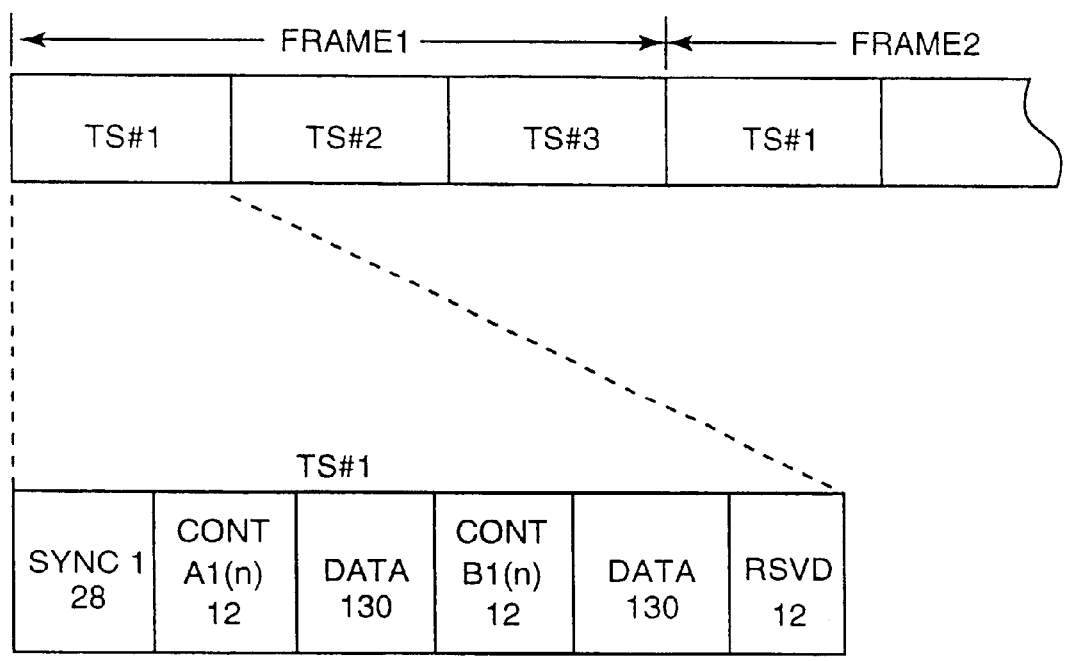
FIG. 2 is a drawing showing the detailed organization of a time slot of the downlink.

Each of the above described circuits is supplied with a clock 11. Also, each of the circuits carries out a fixed operation according to a mode command supplied from a control section 12. Here, in FIG. 2, the voice coder 1 and voice decoder 10, and the channel coder 2 and channel decoder 9 are shown as respectively separate blocks, but these blocks can be realized as software processes within a DSP (Digital Signal Processor).

This base station BS has eight modes for respectively encoding and decoding signals for transmission and reception. The control section 12 of the base station BS selects one mode from the eight modes, for every one unit of signal coding. Since this embodiment has been described using the TDMA system as an example, one encoding unit means one time slot. Accordingly, the content of the error correction processing and correction decoding processing carried out by the channel coder 2 and channel decoder 9 are altered. The mode selection discussed here refers to the selection of a number of bits for error correction coding per time slot. In the following, description will be given for each mode using an example of the encoding operation in the case where voice communication is carried out on a down link (communication from the base station BS to the mobile station MS).

(A) Mode 0: convolutional Encoding Mode.

In this mode, a conventional encoding system is selected. For example, general error correction encoding (convolutional encoding) is carried out for a voice signal that has been encoded at a rate of 7.95 kbps, using VSELP (Vector Sum Excited Linear Prediction). As a result, a 13 kbps information string is obtained.

This encoding sequence will be described in specifically. VSELP has a transmission capacity of 159 bits in 20 ms (i.e. 7.95 kbps). The channel coder 2 separates this 159 bits of data into 77 most significant bits (MSB) and 82 least significant bits (LSB). The 77 MSB are class 1 information and subjected to error correction processing. The 82 LSB are class 2 information and are not subjected to error correction processing. Accordingly, the channel coder 2 adds 7 bits of CRC code and 5 initial bits of convolutional code, i.e. a total of 12 bits, to the class 1 information. As a result, 89 bits of information are obtained.

Next, 178 bits of information are obtained by carrying out convolutional encoding at a rate of ½. This 178 bits of data is finally combined with the 82 bits of class 2 information to generate a 260 bit information string in 20 ms (i.e. a transmission rate of 13 kbps). The overall number of bits is obtained by the above described encoding can be expressed by the following equation (1). In equation (1), n1 is the number of bits of class 1 information, and C1 is the number of bits of CRC code.

$$nALL = 2^*(n1 + C1 + 5) + 159 - n1) \quad (1)$$
$$= 2^*(77 + 7 + 5) + (159 - 77)$$
$$= 2^*89 + 82$$
$$= 260$$

(B) Mode 1: encoding mode with reduced number of information bits for error correction In this mode, the channel coder 2 divides data of one VSELP slot into 67 MSB bits and 92 LSB bits. The 67 MSB bits are then subjected to error correction coding as class one information, while the 92 LSB bits are not subjected to error correction processing as class two information. Therefore, in mode 1, the number of class one bits n1 is smaller than in the case of mode 0. In addition, cyclic convolutional coding is also carried out on the class one bits. Accordingly, in mode 1, there is no need to attach initial bits of convolutional code, as in mode 0. In this way, the overall number of bits after encoding can be reduced. For example, in mode 1, the overall number of bits after encoding can be obtained from the following equation 2.

$$nALL = 2^*(n1 + C1) + (159 - n1) \quad (2)$$
$$= 2^*(67 + 7) + (159 - 67)$$
$$= 2^*74 + 92$$
$$= 240$$

Thus in mode 1, the overall number of bits can be reduced by 20 bits compared to the case (C) Mode 2: cyclic conventional encoding for thinning out error correction coding rate using punctured code Next, encoding in mode 2 will be described. In mode 2, the channel coder 2 divides data of one VSELP slot into MSB and LSB. When the MSB are then subjected to error correction processing as class one information, a reduction in the overall bit number is achieved by thinning out. The overall bit number in this mode is obtained from the following equation (3).

$$nALL = K^*(n1 + C1) + (159 - n1) \quad (3)$$
$$= (K - 1)^*n1 + K^*C1 + 159$$

As can be understood from this equation, with this encoding, the smaller the value of the coefficient K, the more the overall number of bits can be reduced. What this means is that the coefficient K influencing the overall bit number is the reciprocal of the encoding rate. Here, by subjecting a coding rate ½ (K=2) to punctured code encoding, the value of the coefficient K is made small. If a 10 bit input is encoded at a coding rate of ½, the output is 20 bits. In this case, for example, if is it considered that the number of bits to be thinned out using punctured code is 5 bits, 5 bits of the 20 bits are not transmitted. That is, the result after punctured coding is that the output for a 10 bit input is a 15 bit output. This is equivalent to the encoding becoming ⅔. Namely, it is equivalent to the coefficient K being 1.5.

At this time, if the number of class one bits n1 is 77 bits, and the number of CRC code bits C1 is 7 bits, the overall number of bits obtained from equation (3) will be as described below. Thus it will be understood that the overall number of bits has been reduced.

$$nALL = (1.5 - 1)^*77 + 1.5^*7 + 159$$
$$= 208$$

(D) Mode 3: Encoding with block code

In mode 3, block code is used in the encoding. That is, in mode 0 to mode 2, to code an information block at a certain point in time, information prior to that information block (already coded information) was also used. Differing from this, in mode 3, to encode a certain information block, encoding processing is carried out using only that block. In this case, the overall bit number is represented by the following equation (4).

$$nALL = K^*(n1 + C1) + (159 - n1) \quad (4)$$
$$= (K - 1)^*n1 + K^*C1 + 159$$

This method is equivalent to the case of making the coefficient K small using a separate method from the punctured code in the case of mode 2, and changing the number of class one bits n1.

(E) Mode 4: Encoding by not transmitting some of class two information

Next, the case of encoding in mode 4 will be described. In mode 4, the channel coder 2 divides data of one VSELP slot into 77 MSB bits and 82 LSB bits. The 77 MSB are then subjected to error correction processing as class one information. The 82 LSB, as class two information, are reduced by a fixed number of bits. The two are then combined and subjected to cyclic convolutional encoding at a rate of ½. An information string to be transmitted is thus obtained.

Namely, the channel coder 2 attaches 7 bits of CRC code to the class one information. As a result, 84 bits of information are obtained, being the class one information with 7 bits added. If the number of bits by which the class two information is reduced is taken as nx, the overall number of bits is then represented by the following equation (5).

$$nALL = 2^*(n1 + C1) + (159 - n1 - nx) \quad (5)$$
$$= 2^*(77 + 7) + (159 - n1 - nx)$$
$$= 250 - nx$$

(F) Mode 5: Encoding with a reduced number of CRC (cyclic redundancy check) code bits.

Next, the encoding of mode 5 will be described. In mode 5, the channel coder 2 divides data of one VSELP slot into 77 MSB bits and 8 LSB bits. The MSB bits are class one information and the LSB bits are class two information. CRC bits to be attached to the class one information are reduced compared to each of the modes that have already been described. In this mode, if the number of bits by which the CRC is reduced is called ny, the overall number of bits is represented by the following equation (6).

$$nALL = 2^*(n1 + C1 - ny) + (159 - n1) \quad (6)$$
$$= n1 + 2^*(C1 - ny) + 159$$

(G) Mode 6: combination using the above described mode 0 to mode 5.

In mode 6, an encoding method that is a combination of either of the above described mode 0 to mode 5 is indicated. The overall number of bits is represented by the following equation (7).

$$nALL = 1.5^*(n1 + C1 - ny) + (159 - n1 - nx)$$
$$= (K - 1)^*n1 + K^*C1 + 159 - K^*ny - nx$$

For example, if the number of class one bits is 77, number of CRC bits C1 is 7, and the coefficient K is 1.5, the overall number of bits nALL will be as shown below, and it is possible to drastically reduce the number of bits.

$$nALL = 1.5^*(77 + 7 - ny) + (159 - 77 - nx) \quad (7)$$
$$= 208 - 1.5^*ny - nx$$

(H) Mode 7: coding attaching only error detection code and not attaching error correction code.

Mode 7 is an example where the number of class one bits n1 is zero in mode 0. Namely, the overall number of bits is as represented by the following equation (8).

$$nALL = 2^*(0 + C1) + (159 - 0) \quad (8)$$
$$= 2^*C1 + 159$$

For example, if there are 7 CRC bits C1, the overall number of bits nALL is 173 and it is possible to significantly reduce the overall number of bits.

As has been described above, the base station BS selects an appropriate encoding method for every time slot. By repeating this selection, it is possible to reduce the overall number of bits in one frame. By appropriately determining a practically reduced overall number of bits, one frame (20 ms, 972 bits) can be divided into four or more time slots. This means that the number of mobile stations that can be multiplexed at a single frequency can be made larger. It is preferable that among the control channel time slots, time slots that are being used for the transmission of various control information are not subjected to bit number reduction. This means that if one time slot within one frame is used for transmission of control information without being subjected to bit reduction, there are 648 bits left. These remaining bits are divided into 3, and in use for subscribers communication no more than 216 bits are required per single time slot. This can be achieved using, for example, the mode 4 encoding method from the above described coding methods, and reducing class two information by 35 bits. If the number of bits is reduced further, it is possible to multiplex 5 or more time slots into a single frame.

In this invention, it is possible to automatically determine which services are provided for a user. With the spread of mobile communication services, user environments and service classifications are also becoming more diversified. User environments of mobile stations are now largely classified into three categories, namely office (fixed) environments, pedestrian type moving environments, and high speed moving environments. As further service classifications, there is also an increased demand for various types of data communication other than voice calls. However, recommendations relating to conventional mobile communication systems have set extremely strict conditions and high quality to cope with, for example, voice calls for high speed moving environments. As a result, when sufficient communication is carried out at a less strict quality, it is also possible for the practically required quality to be even lower than a quality determined by the recommendations.

As an example, a case will be considered where a certain user makes a call from inside a travelling vehicle. This call requires a voice service relating to a high speed moving environment. This call goes by way of a macrocell base station. Now suppose that this user later gets out of the vehicle and walks into a shopping mall. This call will probably be made through a micro cell base station. In that case, a request will be made for a packet communication service, for example. If packet communication is used, retransmission control is carried out using a higher order layer, and communication quality is guaranteed. However, the quality that should be guaranteed by a network is low compared with the quality that should be guaranteed for a quickly moving environment. Accordingly, there is substantially no problem even if the service quality that the network provides to this user is made slightly lower. The network can apply the thus obtained margin to a user requesting a higher quality service. In this way, by automatic determining a service provided for a specified user, it is possible to effectively use the radio resources of the overall system. As a result, the capacity of the system is increased. Namely, in this invention, the necessary quality for a service requested by an individual user is automatically provided according to the circumstances of that user, without providing a uniformly high quality service for all users. Since mode designation is carried out for every time slot, it is possible to easily change the mode of a call, even while a user is making a call.

In this way, a digital voice signal that has been encoded using a suitable encoding method is transmitted to a mobile station MS. The base station BS transmits encoding information about which encoding method was used to the mobile station MS. This encoding information is equivalent to information used by the mobile station MS for decoding a received signal. This encoding information is put into a control channel of the downlink and transmitted. Therefore, the mobile station MS can decode a signal transmitted from the base station BS by decoding this decoding information from the received signal. When the mobile station MS carries out communication using the uplink (communication from the mobile station MS to the base station BS), the mobile station MS carries out voice encoding using a mode that has been designated from the base station BS.

A description of an encoding operation when voice communication is carried out has been given above, but a similar operation is also carried out for other types of services. The description above was also for communication in a downlink, but similar encoding and decoding is also used for the downlink.

Two sequences for switching mode while a user is making a call can be considered, namely, for when the mobile station MS initiates communication and when the base station BS initiates communication. If the mobile station MS initiates the mode switching sequence, the mobile station MS automatically transmits a mode switching request to the base station BS. The base station BS approves this request, and at the same time determines the new mode to be assigned to the mobile station MS, the frequency CH and slot position to be used. The base station BS puts this information into control information of a control channel (as described above) and transmits it to the mobile station. The mobile station MS carries out tuning to the mode CH and slot that have been assigned and continues communication. On the other hand, when the base station BS initiates the mode switching sequence, the base station BS confirms the specification of the mobile station MS currently being communicated with. Here, the specification, refers to, for example, whether or not mode x is handled, and whether or not voice, data, packet communication type services are handled, etc. Thereafter, the base station BS determines the new mode to be assigned to the mobile station MS, the frequency CH and slot position to be used. The base station BS puts this information into control information of a control channel (as described above), and transmits it to the mobile station MS. Mode switching is carried out, for example, in the following cases.

(1) A mobile station receives services from another base station.

The base station BS periodically monitors the position of the mobile station MS. The base station can instruct mode switching for the mobile station as a result of this monitoring. That is, when it has been decided that the mobile station can receive services from a separate base station, or when it has been decided that the mobile station should receive services from another base station, mode switching is instructed. Whether or not the mobile station can receive radio waves from another base station can be decided using peripheral level measurement functions of the mobile station.

The mobile station also periodically searches for control channels of surrounding base stations, even during communication with a particular base station. If there is a suitable control channel, the mobile station changes over to connection to that control channel. At that time, the mobile station transmits a mode switching request. A base station control channel list to be searched by the mobile station is notified to the mobile station using a method such as b1) manual registration in the mobile station, b2) writing in the mobile station at the time of shipping from a factory, b3) broadcasting using an information channel, etc. The mobile station always has this base station control channel list stored in its memory.

(2) Change of service type for a user.

Even while communication is continuing between a base station and a mobile station, requests for changing the provided service are generated. For example, as has been described previously, when voice communication for a fast moving environment is changed to a packet communication service for a pedestrian environment.

(3) Change in peripheral environment of mobile stations.

The mobile stations periodically monitor their own peripheral environment. What is monitored is, for example, a receive level and fluctuations in the receive level, receive signal error rate, frequency characteristics of a propagation path used by synchronization words, etc. The mobile stations detect changes in peripheral environment from these monitoring results, doppler frequency values of received signals, etc. It is possible for the mobile station to voluntarily request mode changes based on the detected results. Alternatively it is possible for the mobile stations to periodically notify the detected results to the base station, and have the base station decide mode changes.

(4) For example, when a user returns home, home mode (interior, low error mode) is personally decided and selected. The user manually sends this mode change request to the base station.

5) Traffic congestion.

The base station is always monitoring the overall system traffic. When numerous mobile stations are in communication and traffic becomes congested, the base station instructs mode changes for the mobile stations. Instructing mode changes to modes having a greater reduction in the number of bits is easily understood by a person having ordinary skill in the art.

Within the above described mode changes, the mode switching of cases (1) to (3) are initiated from one of a mobile station. However, a person having ordinary skill in the art will easily understand that of case (4) is from the base station.

Industrial Applicability

In the embodiment described above, a description has been given for a reduction in the number of bits of a signal on a carrier frequency being used as a control channel. Similarly, the number of bits of a signal on a carrier frequency being used as a communication channel can also be reduced. Further, this invention is also applicable even in the case where a plurality of subscribers are code division multiplexed on a single carrier frequency. This invention is not limited to digital cellular systems, and can also be applied to computers, and portable information devices such as electronic note books (Personal Digital Assistance (PDA)).

What is claimed is:

1. A mobile communication system comprised of at least one base station and at least one mobile station, said at least one base station comprising:
   encoding means for encoding an encoding unit of a transmission signal for said at least one mobile station, wherein said encoding means encodes said transmission signal for each encoding unit by dividing said encoding unit into a plurality of fixed bits classes and then performing a fixed error correcting method to each said class;
   control means for controlling said encoding means; and
   transmission means for transmitting said encoded transmission signal for said at least one mobile station, wherein
   said control means has a plurality of encoding modes which are different in one of the number of bits and the fixed error correcting method for said encoding means, selects one suitable encoding mode from among said plurality of encoding modes for each said encoding unit, and instructs said mobile station on decoding information concerning a selection of said encoding mode.

2. A mobile communication system according to claim 1, wherein said plurality of encoding modes are different in the number of total bits.

3. A mobile communication system according to claim 1, wherein one of said plurality of encoding modes executes punctured code encoding.

4. A mobile communication system according to claim 1, wherein said transmission signal is encoded by VSELP, and said encoding means separates said encoded transmission signal into most significant bits (MSB) and least significant bits (LSB).

5. A mobile communication system according to claim 2, wherein said mobile communication system is a TDMA system, and said encoding unit equals one time slot of the TDMA system.

6. A mobile communication system according to claim 1, wherein said at least one mobile station has means for reporting surrounding environment of said at least one mobile station to said at least one base station, and said control means instructs said one suitable encoding mode for said at least one mobile station based on contents of said report from said at least one mobile station.

7. A mobile communication system according to claim 1, said at least one mobile station comprising:
   mobile station decoding means having a plurality of decoding modes corresponding to said plurality of encoding modes and selecting one of said plurality of decoding modes based on said decoding information for decoding a receive signal from said base station.

8. A mobile communication system according to claim 7, said at least one mobile station further comprising:
   a mobile station encoding means for encoding a mobile station transmission signal, wherein said mobile station encoding means encodes said mobile station transmission signal of each said encoding unit by dividing said encoding unit into a plurality of fixed bits classes and then performing a fixed error correcting method to each said class;
   mobile station control means for controlling said mobile station encoding means; and
   mobile station transmission means for transmission said encoded mobile station transmission signal for said at least one mobile station, wherein said mobile station control means has said plurality of encoding modes for said mobile station encoding means and selects one suitable encoding mode from among said plurality of encoding modes for every said encoding unit.

9. A mobile communication system according to claim 8, wherein said mobile station control means informs and at least one base station of said mobile station's encoding mode selection.

10. A mobile communication system according to claim 8, wherein said mobile station control means selects the same encoding mode as said base station's encoding mode selection for said mobile station encoding mode.

11. The mobile communication system as disclosed in claim 1, wherein said at least one mobile station comprises encoding means for encoding a transmission signal for said at least one base station; and decoding means for decoding a receive signal received from said at least one base station.

12. The mobile communication system as disclosed in claim 11, wherein said encoding means of said at least one mobile station encodes the transmission signal for said at least one base station using the encoding method that was used by said at least one base station.

* * * * *